United States Patent
Gilleland

(10) Patent No.: US 8,391,275 B2
(45) Date of Patent: Mar. 5, 2013

(54) PROVIDING CALLING PARTY INFORMATION IN A REQUEST TO ESTABLISH A CALL SESSION

(75) Inventor: Michael E. Gilleland, St. Paul, MN (US)

(73) Assignee: Rockstar Consortium US LP, New York, NY (US)

( * ) Notice: Subject to any disclaimer, the term of this patent is extended or adjusted under 35 U.S.C. 154(b) by 1578 days.

(21) Appl. No.: 11/811,113

(22) Filed: Jun. 8, 2007

(65) Prior Publication Data

US 2007/0242810 A1  Oct. 18, 2007

Related U.S. Application Data

(62) Division of application No. 09/732,128, filed on Dec. 7, 2000, now Pat. No. 7,277,533.

(51) Int. Cl.
 *H04L 12/66* (2006.01)
(52) U.S. Cl. ......................... 370/352; 370/235
(58) Field of Classification Search .................. 709/206; 379/143, 352; 370/143, 352, 235
See application file for complete search history.

(56) References Cited

U.S. PATENT DOCUMENTS

| | | | |
|---|---|---|---|
| 5,864,604 A * | 1/1999 | Moen et al. ................. | 379/114.2 |
| 6,359,880 B1 * | 3/2002 | Curry et al. .................... | 370/352 |
| 6,438,601 B1 * | 8/2002 | Hardy ........................... | 709/229 |
| 6,570,870 B1 * | 5/2003 | Berstis .......................... | 370/352 |
| 6,654,815 B1 | 11/2003 | Goss et al. | |
| 6,757,274 B1 * | 6/2004 | Bedingfield et al. .......... | 370/352 |
| 6,771,639 B1 | 8/2004 | Holden | |
| 6,775,365 B1 * | 8/2004 | Norby ............................ | 379/143 |
| 6,791,974 B1 * | 9/2004 | Greenberg ..................... | 370/352 |
| 6,990,514 B1 * | 1/2006 | Dodrill et al. ................. | 709/206 |
| 7,269,160 B1 * | 9/2007 | Friedman et al. ............. | 370/352 |
| 7,747,761 B2 * | 6/2010 | Wengrovitz ................. | 709/228 |
| 7,817,619 B1 * | 10/2010 | Curry et al. .................... | 370/352 |
| 7,876,885 B2 * | 1/2011 | Riikonen et al. ........... | 379/88.17 |
| 2002/0131574 A1 | 9/2002 | Alleman | |
| 2004/0005046 A1 | 1/2004 | Deo et al. | |
| 2004/0090954 A1 | 5/2004 | Zhang et al. | |
| 2005/0147224 A1 | 7/2005 | Olafsson et al. | |
| 2008/0304471 A1 * | 12/2008 | Jackson et al. ................ | 370/352 |
| 2009/0054092 A1 * | 2/2009 | Stonefield et al. ............ | 455/466 |
| 2009/0225745 A1 * | 9/2009 | Jackson et al. ................ | 370/352 |
| 2010/0135473 A1 * | 6/2010 | Dewing et al. ............. | 379/88.13 |

FOREIGN PATENT DOCUMENTS

| EP | 1 024 643 A | 8/2000 |
|---|---|---|
| WO | WO 00 33550 A | 6/2000 |

OTHER PUBLICATIONS

S. Donovan, "The SIP Info Method," IETF Request for Comments, Oct. 2000, pp. 1-9.
J. Postel; Request for Comments 768, "User Datagram Protocol", Aug. 28, 1980, pp. 1-3.
Information Sciences Institute, Request for Comments 791, "Internet Protocol—DARPA Internet Program, Protocol Specification," Sep. 1981, pp. 1-48.

(Continued)

*Primary Examiner* — Krisna Lim

(74) *Attorney, Agent, or Firm* — Anderson Gorecki & Rouille LLP

(57) ABSTRACT

A method and apparatus are provided for providing calling party information in a request to establish a call session. The method comprises receiving a call request from an entity to establish an interactive call session. The method comprises receiving information associated with the entity. The method further comprises providing the information in the call request.

15 Claims, 6 Drawing Sheets

OTHER PUBLICATIONS

Information Sciences Institute, Request for Comments 793, "Transmission Control Protocol—DARPA Internet Program, Protocol Specification," Sep. 1981, pp. 1-91.

H. Schulzrinne, Network Working Group, Request for Comments 1889, "RTP: A Transport Protocol for Real-Time Applications", Jan. 1996, pp. 1-69.

N. Freed, et al., Network Working Group, Request for Comments 2046, "Multipurpose Internet Mail Extensions (MIME) Part Two: Media Types", Nov. 1996, pp. 1-42.

R. Braden, et al., Network Working Group, Request for Comments 2205, Resource ReSerVation Protocol (RSVP)—Version 1 Functional Specification, Sep. 1997, pp. 1-109.

H. Schulzrinne, et al., Network Working Group, Request for Comments 2326, "Real Time Streaming Protocol (RTSP)," Dated Apr. 1998, pp. 1-81.

M. Handley, et al., Network Working Group, Request for Comments 2327, "SDP: Session Description Protocol", Apr. 1998, pp. 1-39.

E. Whitehead, et al., Network Working Group, Request for Comments 2376, "XML Media Types", Jul. 1998, pp. 1-15.

S. Deering, et al., Network Working Group, Request for Comments 2460, "Internet Protocol, Version 6 (IPv6) Specification," Dec. 1998, pp. 1-36.

M. Handley, et al., Network Working Group, Request for Comments 2543, "SIP: Session Initiation Protocol", Mar. 1999, pp. 1-153.

* cited by examiner

```
INVITE sip:sales@callcenter.com SIP/2.0
Via: SIP/2.0/UDP home.com:5060
From: AlfredENeuman <sip:AlfredENeuman@home.com>
To: sip:sales@callcenter.com
Call-ID: 12345600@home.com
CSeq: 1 INVITE
Contact: AlfredENeuman <sip:AlfredENeuman@home.com>
Content-Length: nnn
Content-Type: multipart/mixed; boundary=23xx1211

--23xx1211
Content-Type: application/sdp v=0
o=AlfredENeuman 2890844526 2890844526 IN IP4 home.com
s=Session SDP
c=IN IP4 100.101.102.103
t=0 0
m=audio 49172 RTP/AVP 0
a=rtpmap:0 PCMU/8000
--23xx1211
Content-Type: text/html <HTML><BODY>
<H1>Recent Purchases by Alfred E. Neuman</H1>
<TABLE BORDER=1 COLS=2>
<TR><TD>Date</TD><TD>Item</TD></TR>
<TR><TD>12 January 1999</TD><TD>Ginsu Knife</TD></TR>
<TR><TD>1 April 1999</TD><TD>Clapper</TD></TR>
<TR><TD>25 December 1999</TD><TD>L. Welk's Greatest Hits</TD></TR>
</TABLE></BODY></HTML>
--23xx1211
  ••
--23xx1211--
```

FIG. 3

PROVIDING CALLING PARTY INFORMATION IN A REQUEST TO ESTABLISH A CALL SESSION

CROSS-REFERENCE TO RELATED APPLICATION

This application is a divisional of U.S. Ser. No. 09/732,128, filed Dec. 7, 2000, which issued as U.S. Pat. No. 7,277,533 on Oct. 2, 2007, the content of which is hereby incorporated by reference.

TECHNICAL FIELD

The invention generally relates to providing calling party information in a request to establish a call session.

BACKGROUND

Packet-based data networks are widely used to link various types of network elements, such as personal computers, servers, gateways, network telephones, and so forth. Data networks may include private networks (such as local area networks or wide area networks) and public networks (such as the Internet). Popular forms of communications between network elements across packet-based data networks include electronic mail, file transfer, web browsing, and other exchanges of digital data.

With the increased capacity and reliability of packet-based data networks, voice communications (including telephone calls, video conferencing, and so forth) over data networks have become possible. Voice communications over data networks are unlike voice communications in a conventional public-switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data sent over a data network typically shares network bandwidth with conventional non-voice data (e.g., data associated with electronic mail, file transfer, web access, and other traffic).

Various standards have been proposed for voice and multimedia communications over data networks. One such standard is the H.323 Recommendation from the International Telecommunications Union (ITU), which describes terminals, equipment, and services for multimedia communications over data networks.

Another standard for voice and multimedia communications is the Session Initiation Protocol (SIP), which establishes, maintains, and terminates multimedia sessions over a data network. SIP is part of a multimedia data and control architecture developed by the Internet Engineering Task Force (IETF). The IETF multimedia data and control architecture also includes other protocols to enable voice and multimedia sessions over data networks, including the Resource Reservation Protocol (RSVP) for reserving network resources; the Real-Time Transport Protocol (RTP) for transporting real-time data and providing quality of service (QoS) feedback; the Real-Time Streaming Protocol (RTSP) for controlling delivery of streaming media; the Session Announcement Protocol (SAP) for advertising multimedia sessions by multicast; and the Session Description Protocol (SDP) for describing multimedia sessions.

In the burgeoning field of Internet telephony, the ability to provide calling party information to a receiving party while establishing a call session is somewhat limited. The calling party information may, in one embodiment, include any information that may be somewhat associated with a party that originates a call request. Access to such information, in some instances, may be useful, and perhaps desirable, to a party receiving the call request.

A need thus exists for providing calling party information to a receiving party in a request to establish a call session.

SUMMARY

In general, according to one embodiment, a method and apparatus are provided for providing calling party information in a request to establish a call session. The method comprises receiving a call request from an entity to establish an interactive call session. The method comprises receiving information associated with the entity. The method further comprises providing the information in the call request.

Some embodiments of the invention may include one or more of the following advantages. By providing information associated with a caller to the called party, the called party may be in a better position to more effectively respond to the calling party. For example, a customer representative may be provided information such as past purchases and/or contact information of a calling customer, as a call is received from the customer. As such, the customer representative may be in a better position to serve the customer in a more efficient manner.

Other features and advantages will become apparent from the following description, from the drawings, and from the claims.

BRIEF DESCRIPTION OF THE DRAWINGS

The invention may be understood by reference to the following description taken in conjunction with the accompanying drawings, in which like reference numerals identify like elements, and in which:

FIG. 3 illustrates a message according to a Session Initiation Protocol (SIP) in accordance with one embodiment, the SIP message including calling party information;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Session Initiation Protocol (SIP) in the described embodiments, other protocols for establishing interactive, real-time communications may be employed in further embodiments.

Figure 1:
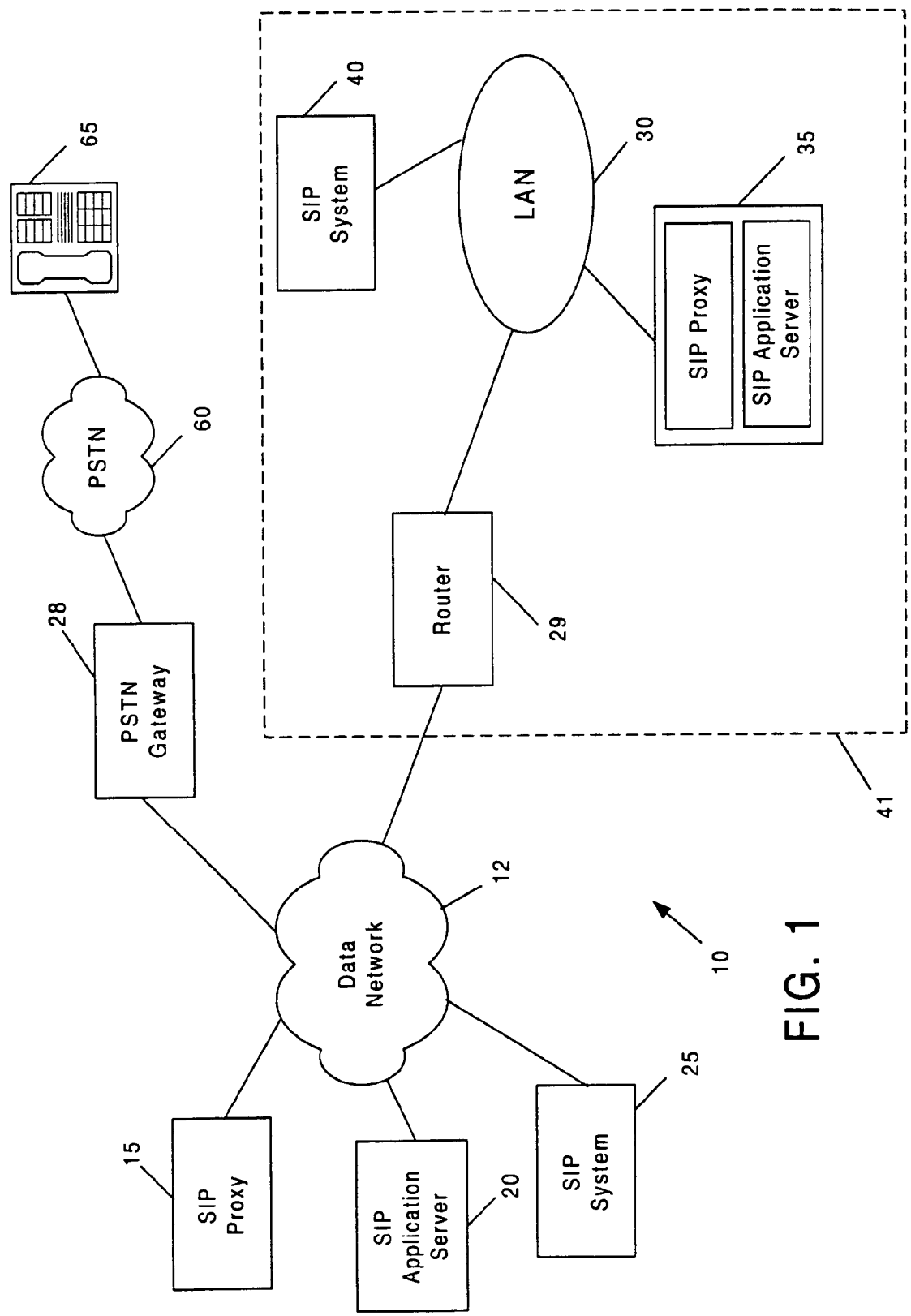
FIG. 1 is a block diagram of an embodiment of a communications system including a packet-based data network.

Referring to FIG. 1, a communications system 10 includes a data network 12 that may be coupled to various systems 15, 20, 25, and 28. The data network 12 may be a packet-switched data network, such as a data network according to the Internet Protocol (IP). Examples of the data network 12 include local area networks (LANs), wide area networks (WANs), and the Internet.

One version of EP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 12 may also include other types of packet-based data networks in further embodiments. Examples of such other packet-based data networks include Asynchronous Transfer Mode (ATM) and Frame Relay networks.

As used here, a "data network" may refer to one or more communications networks, channels, links, or paths, and systems or devices (such as routers) used to route data over such networks, channels, links, or paths. Packet-switched data networks such as IP networks communicate with packets, datagrams, or other units of data over the data networks. Unlike circuit-switched networks, which provide a dedicated end-to-end connection or physical path for the duration of a call session, a packet-switched network is one in which the same path may be shared by several network elements.

Packet-switched networks such as IP networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet. Packet-based networks may also be connection-oriented networks, such as ATM and Frame Relay networks. In a connection-oriented packet-based network, a virtual circuit or connection is established between two end points. In such connection-oriented networks, packets are received in the same order in which they were transmitted.

The communications system 10 may include a second network 30 that may be coupled to the data network 12 through a router 29. The second network may be a LAN, WAN, and the like. Various systems 35 and 40 may be coupled to the second network 30. In one embodiment, the elements 29, 30, 35, and 40 may be located at customer premises 41, such as a corporation site, where the router 29 links the customer premises 41 to the data network 12.

The systems 20, 35 and 40 may communicate over the data network 12 according to a Session Initiation Protocol (SIP). SIP is part of the multimedia data and control architecture from the Internet Engineering Task Force (IETF). A version of SIP is described in RFC 2543, entitled "SIP: Session Initiation Protocol," dated August 1999. SIP may be used to initiate call sessions as well to invite members to a session that may have been advertised by some other mechanism, such as electronic mail, newsgroups, web pages, and other mechanisms. The other protocols in the IETF multimedia and control architecture include the Resource Reservation Protocol (RSVP), as described in RFC 2205; the Real-Time Transport Protocol (RTP), as described in RFC 1889; the Real-Time Streaming Protocol (RTSP), as described in RFC 2326; the Session Description Protocol (SDP), as described in RFC 2327; and the Session Announcement Protocol (SAP).

Other standards may be employed in further embodiments for controlling call sessions over the data network 12. Such other standards may be any other standard that provides for interactive, real-time voice or multimedia communications over the data network 12. One alternate standard is the H.323 Recommendation from the International Telecommunications Union (ITU).

As used here, a "call session" refers generally to either a voice, video, or a multimedia session established between two or more network elements (and parties using those elements) coupled to the data network 12 (or any other packet-based data network). As used here, an "interactive" call session refers to a call session in which two or more parties are involved in an exchange of voice and/or video data in an established session between two or more network elements. A "real-time" interactive call session refers to an exchange of data, such as audio and/or video data, on a substantially real-time basis between two terminals. A session is substantially real time if interaction is occurring between two end points or parties, with a communication from one end point followed relatively quickly by a response or another communication from the other end point, typically within seconds, for example.

Interactive call sessions are contrasted with electronic mail messaging, for example, in which a first participant sends a message over a data network to a second participant. No indication is usually provided back to the first participant that the second participant has received the message or that the second participant is even at his or her terminal. In contrast, an interactive session involves a request followed by some acknowledgment that a called party has accepted the call request. This enables the interactive session in which participants exchange data (e.g., voice, video, and/or text).

As shown in FIG. 1, the systems 25 and 40 are referred to as SIP systems, which may be SIP clients or SIP servers. A SIP client system includes client application programs that are capable of sending SIP requests to perform call requests. A SIP server system includes application programs that accept SIP requests to service calls and to send back responses to SIP requests. Thus, the systems 25 and 40 may be SIP client systems some of the time and SIP server systems other times.

A PSTN gateway 28 provides a gateway between the data network 12 and a public-switched telephone network (PSTN) 60, which is coupled to circuit-switched telephone systems. The PSTN gateway 28 may also include elements to enable it to participate in SIP call sessions over the data network 12. A caller at a telephone system 65 may place a circuit-switched call through the PSTN 60 to the PSTN gateway 28. The PSTN gateway 28 then converts the call into a SIP call request that may be sent to one of the systems 25 and 40 to establish a call session between the telephone system 65 and the SIP system. The reverse process may also be performed in which a SIP system initiates a call through the PSTN gateway 28 to one of the telephone systems 65.

The systems 15 and 35 may each be a SIP proxy system, which includes an intermediary program that acts as both a server and a client for making requests on behalf of other clients. Thus, for example, the SIP system 25 may make a call request to the SIP system 40 directly through the data network 12. Alternatively, the system 25 may go through the SIP proxy system 15 to make the call to the SIP system 40.

The system 35, in addition to serving as a SIP proxy server, may also be a SIP application server for SIP systems (e.g., SIP system 40) located at the customer premises 41, for example.

The SIP application server 20, in one embodiment, may be a server for the SIP system 25. In one embodiment, the systems 35 and 20 may identify the intended recipient of a call request and then route the call request to the appropriate destination. In some embodiments, the SIP application server functionality may be implemented in a standalone network element or other network elements of the communications system 10 of FIG. 1.

In one embodiment, the systems 20 and 35 may include mechanism(s) for modifying a call request (e.g., SIP Invite message) to include calling party information. In some embodiments, such a mechanism may be the SIP common gateway interface (CGI), a proposed version of which is described in an Internet draft at http://search.ietf.org/internet-drafts/draft-lennox-sip-cgi-04.txt, entitled "Common Gateway Interface for SIP," by J. Lennox et al., dated Jun. 5, 2000. In another embodiment, such a mechanism may be SIP servlets, a proposed version of which is described in an Internet draft at http://www-uk.hpl.hp.com/people/ak/sip/servlet/draft-kristensen-sip-servlet-00.txt, entitled "The SIP Servlet API," by A. Kristensen and A. Byttner, dated September 1999. The SIP servlet API proposes a Java extension API for SIP servers. It allows SIP server functionality to be extended by associating incoming requests and responses with SIP servlets. In alternative embodiments, other scripting languages may be used to modify the call request to include the calling part information.

In accordance with some embodiments, in call sessions over the data network 12, call requests between network elements may include calling party (or entity) information. Such call requests may also be referred to generally as invitations to participate in the desired session. In one example, and is described in more detail below, the SIP application server system 20 or 35 intercepts a call request, adds the calling party information associated with the call request within the call request, and forwards the call request to the intended destination. In an alternative embodiment, the SIP application server system 20 or 35 intercepts a call request, includes the calling party information associated with the call request within a newly created call request, and forwards the newly created call request to its original destination.

In one embodiment, the calling party information included in the call request conveys to the called party additional information about the calling party. As such, the calling party information may provide useful information about the caller to the called party at the time the call is answered. For example, a sales representative of a business that receives a call from a customer may be provided information about the customer's previous purchases, contact information, and the like when the sales representative answers the call. Based on the calling party information, the called party may be better prepared to respond to the calling party. The terminal or other device on which the calling party information is to be presented is referred to as a "presentation device." In this description, the destination or called party and/or terminal may be generally referred to as the destination or called "entity."

The calling party information may be either embedded in the call request or retrieved from a remote location by the called entity. The call request may include at least a header portion and a body portion. The calling party information according to some embodiments may be contained in the body portion. If data is embedded, then the data (which may be a file, for example) may be part of, attached to, or otherwise associated with the call request. If data is retrieved remotely, then an indication may be provided in the call request concerning the remote location of the data. Even though calling party information may be retrieved remotely, it is still said to be "contained" or "included" in the call request (or another message).

Figure 2:
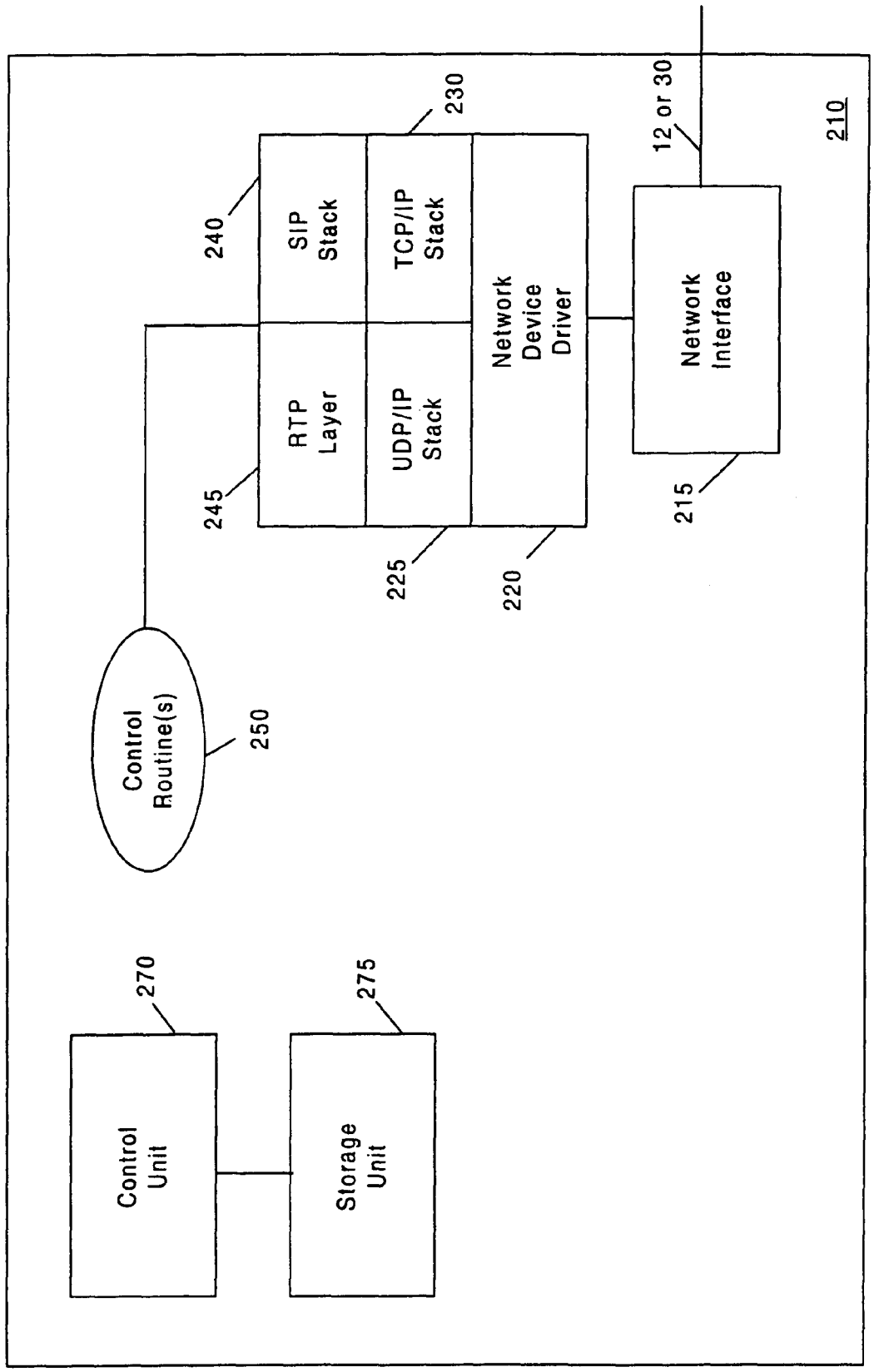
FIG. 2 is a block diagram of a network element in accordance with an example embodiment for use with the data network of FIG. 1.

Referring to FIG. 2, the components of an example network element 210 (such as system 20 or 35) are illustrated. The network element 210 includes a network interface 215 that may be coupled to the data network 12 (for system 20) or second network (for system 35). The data network interface 210 may include a network controller card or chip, as examples. Above the network interface 210 are a network device driver 220 and transport and network stacks 225 and 230 (e.g., a TCP/IP stack 230 and a UDP/IP stack 225). TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network. Above the transport and network stacks are a SIP stack 240 that parses and processes SIP messages (both inbound and outbound). The UDP/IP stack 225 may also be connected to a Real-Time Protocol (RTP) layer 245 that processes and generates real-time data (such as data associated with an audio and/or video call). The RTP layer 245 may also be associated with a Real-Time Control Protocol (RTCP) layer for carrying control information.

The network element 210 may also include one or more control routines 250 that are coupled to receive control signaling from the SIP stack 240 or to provide control signaling to the SIP stack 240 for generation of SIP messages. The control routines 250 can make decisions on how to process the received SIP messages and how to respond to such SIP messages received through the SIP stack 240. For example, such SIP messages may be messages inviting the network elements 25 or 40 to participate in a call session as well as various response messages indicating various stages of the progress of a call session setup.

Referring to FIG. 3, a SIP message 300 that may be employed in communications over the data network 12 between the various network elements includes calling party information in accordance with one embodiment. The illustrated SIP message 300 includes portions of an Invite request. The horizontal lines shown in FIG. 3 are blank lines used in a SIP message to specify message boundaries. Horizontal lines are illustrated for clarity purposes. The SIP message 300 includes a header portion 305 having several fields and a message body 310, which, in one embodiment, may be a SDP message body. A first line of the header portion 305 includes the field "Invite" to indicate that the message 300 is an Invite request. Another line of the header portion 305 may include a VIA field. Following that, the destination address, source address, and identification of the call session may be provided.

The header portion 305 may also include a contact field that contains contact information. A content length and content type fields may also be included in the header portion 305. The content type field may indicate a multipart message having a plurality of message body sections. In one embodiment, one or more of the plurality of message body sections may be of Multipurpose Internet Mail Extensions (MIME) types. One version of MIME is described in RFC 2046, entitled "Multipurpose Internet Mail Extensions (MIME) Part Two: Media Types," dated November 1996. The content type field may be set to the value "multipart/mixed" to indicate that the message body 310 of the message 300 has mixed data types. The boundary between different sections in the message body may be any variety of boundary indications, although in the illustrated embodiment, a sequence "23xx1211" denotes different boundary sections.

The message body 310 of the message 300 may include several sections (a multipart message). A first section 320 may include the standard description of the SIP message under the header "Application/SDP" (indicating that the section 320 includes SDP data with a description of the requested call session). The other sections 325 and 330 may include calling party information that is to be presented to the called entity. In one embodiment, the SIP application system 20 or 35 embeds data stored in the sections 325 and 330, which may later be extracted and presented to the user on the SIP system 15 or 40.

A variety of MIME type message bodies may be included in the message 300. For example, in one embodiment, the SIP application server of the system 305 may include calling party information in a text/Hypertext Markup Language (HTML) format. In another embodiment, the calling party information may be included in an Extensible Markup Language (XML) form (e.g., MIME type text/xml). A version of the XML type is described in RFC 2376, entitled "XML Media Types," dated July 1998. In yet another embodiment, the calling party information may be embedded within a message as Java byte codes (e.g., with a MIME type of application/x-sipjava), which may later be executed and then displayed on the presentation device, such as the SIP system 25 or 35. A version of the MIME type of SIP Java is described in an Internet draft at http:ahsunsite.cnlab-switch.ch/ftp/mirror/internet-drafts/draft-odoherty-sip-java-enhanced-00.txt, by M. O'Doherty, dated March 2000. MIME types are typically assigned by the Internet Assigned Numbers Authority (IANA), and a more comprehensive list of assigned MIME content types and subtypes that may be employed with one or more embodiments of the present invention may be available at http://www.isi.edu/in-notes/iana/assignments/media-types/media-types, for example. In the illustrated message 300 of FIG. 3, for example, the section 325 comprises text/HTML data. Although only three sections 320, 325, 330 are shown in FIG. 3, other embodiments of the message 200 may include only one such section or more than two sections.

FIG. 3 illustrates an exemplary calling party information that may be included within the message 300. The section 320, in one embodiment, includes information provided in the original SIP message. As can be seen based on the header section 305 and the section 320 of the exemplary message 300, the original message is from Alfred E. Neuman to sales@callcenter.com. The calling party information added to the original message is presented in the section 325 of the message 300. FIG. 3 thus illustrates, in one embodiment, the message 300 after it is processed by the SIP application server 20 or 35, with the addition of an HTML data indicating past purchases by Alfred E. Neuman. The content-length field and the content-type field in the header section 305 are updated to reflect the addition of the calling party information to the message 300.

Figure 4:
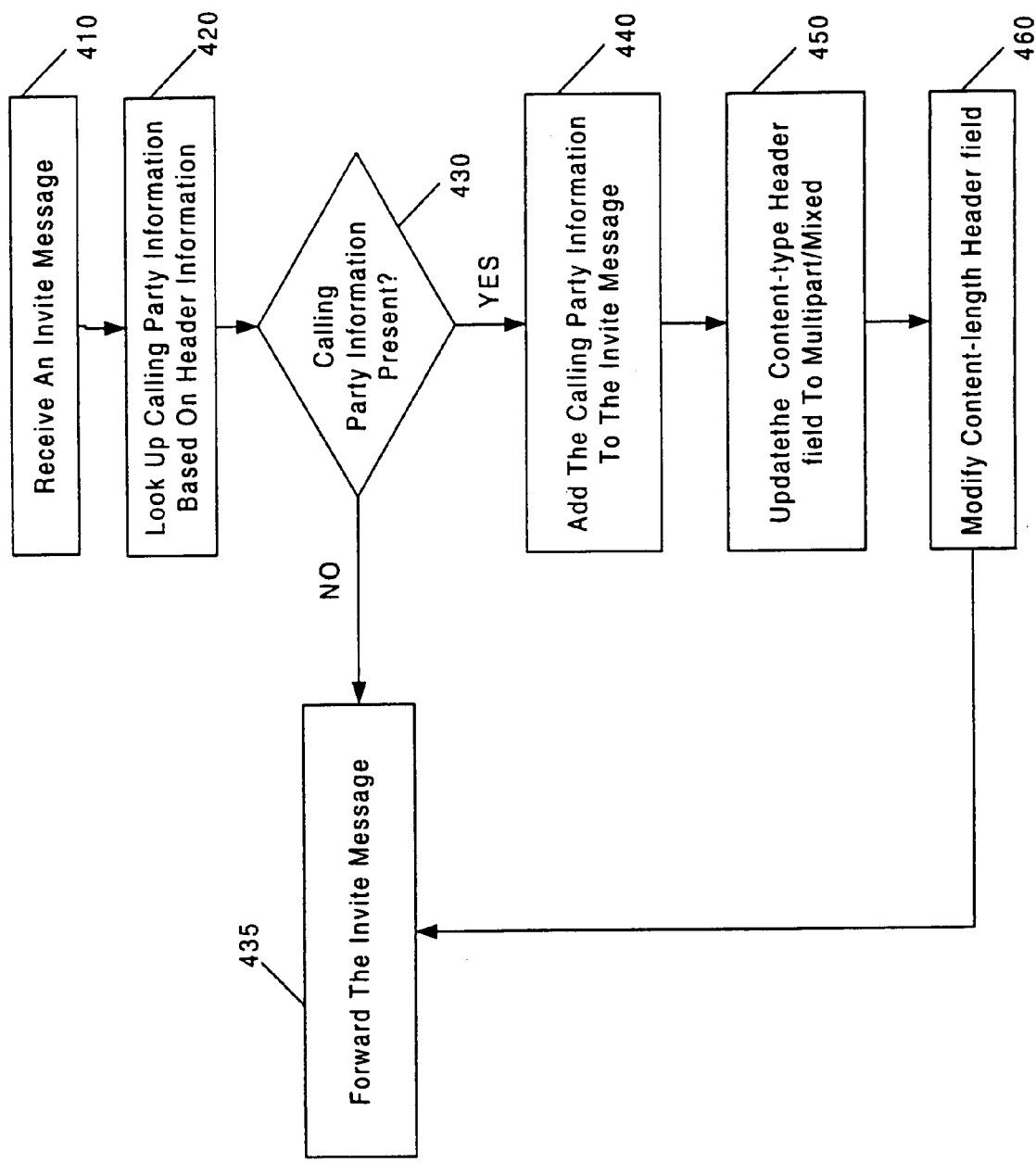
FIG. 4 is a flow diagram of a process performed by a routine to provide calling party information in a call request in the system of FIG. 2 in accordance with one embodiment.

The exemplary contents of the message 300 in FIG. 3 are described in more detail below with respect to a process described in FIG. 4. FIG. 4 illustrates a process performed by the network element 210 in response to receiving a SIP Invite message in one embodiment of the present invention. For illustrative purposes, the process of FIG. 4 is described with respect to a call being placed from the SIP system 25 (from customer AlfredENeuman (see FIG. 3)) to the SIP system 40 (to a sales department call center (see FIG. 3)).

The method of FIG. 4 begins at block 410, where the system 35 (see FIG. 1) receives (in another embodiment, intercepts) a SIP Invite message from the SIP system 25. For example, as shown in the "From" field of the exemplary message 300 of FIG. 3, the SIP invite message is from AlfredENeuman. At block 420, the SIP application server of the system 35 attempts to lookup the calling party information based on the information stored in the header section 305 (e.g., based on the "From" field). As utilized herein, the "calling party information" may include any information associated with the calling party/entity, such as information related to past purchases by the calling party, biographical data of the calling party, or any other storable information that may be useful or desirable about the calling party. In one embodiment, mechanisms such as a SIP CGI script, SIP servlets, and the like, may be utilized to look up information about the calling party or entity. In some embodiments, the calling party information may be looked up or searched in a database using structured query language (SQL).

At block 430, the SIP application server of the system 35 determines if any calling party information exists with respect to the calling party/entity. If no calling party information exists, then, at block 435, the SIP application server of the system forwards the SIP Invite message to its final destination. In one embodiment, it may be possible that the final destination may be the system 35 itself.

If, at the block 430, the SIP application server of the system 35 determines that the calling party information is present in a database or any other storage location, then, at block 440, the system 35 appends the calling party information to the SIP Invite message. In one embodiment, the SIP CGI script or SIP servlet may be utilized to convert the SQL result into a HTML, such as shown in the section 325 of the message 300 in FIG. 3. In the section 325 of the message 300, the calling party information comprises a history of past purchases by the calling party (e.g., AlfredENeuman), although in alternative embodiments, other types of calling party information may be included, such as the contact information or other pertinent or desirable information. In an alternative embodiment, instead of appending to the original SIP Invite message at the block 430, the SIP application server of the system 35 may create a new message that includes the desired information from the original SIP Invite message and the looked-up calling party information. In one embodiment, the calling party information may be included in the SIP Invite message as a text file, an audio file, a video file, or a combination thereof.

At block 450, the SIP application server of the system 35 updates the content-type field in the header section 305 (see FIG. 3) of the message 300 to reflect the added calling party information. In one embodiment, the content-type field is updated from "application/sdp" to "multipart/mixed."

At block 460, the SIP application server of the system 35 updates the content-length field in the header section 305 to reflect the length of the message 300 with the added calling party information. At the block 435, the modified message is forwarded to its final destination, which in the illustrated embodiment is the SIP system 40.

Figure 5:
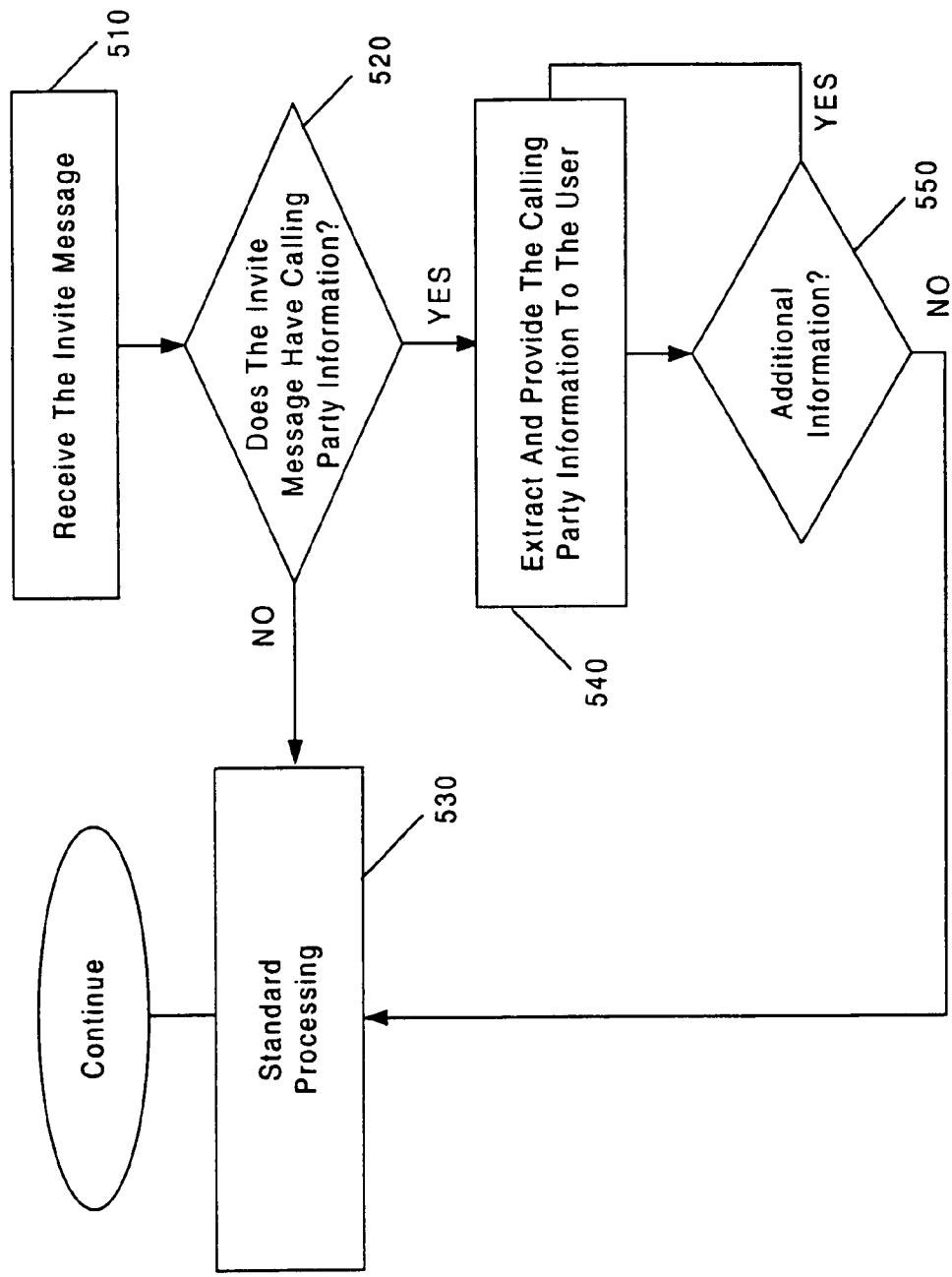
FIG. 5 is a flow diagram of a process performed by a routine executed in a system that receives a call request containing calling party information in accordance with one embodiment.

Referring now to FIG. 5, an exemplary process performed by the SIP system 40 upon receiving the modified SIP Invite message from the system 35 is illustrated. The process of FIG. 5 begins at block 510, where the SIP system 40 receives the Invite message from the system 35. At block 520, the SIP system 40 determines if the SIP Invite message includes the calling party information based on the content-type field of the header section 305. In one embodiment, a multipart/mixed content type may indicate that the SIP message has multiple sections, and may thus contain the calling party information.

If no calling party information is present in the received SIP Invite message, then, at block 530, the SIP system 40 continues with standard SIP processing. If, however, the SIP Invite message includes the calling party information, then the SIP system 40 extracts and provides the calling party information to the user, which in the illustrated embodiment is the customer representative receiving a call request from AlfredENeuman from the SIP system 25. A variety of applications may be employed to provide the calling party information to the user, depending, in part, on the format type of the calling party information. For example, for messages having HTML or XML format, a web browser may be employed. For messages video and/or audio messages, applications capable of processing video and/or audio messages may be employed. For text messages, a word processing application may be employed, for example.

At block 550, in one embodiment, the SIP system 40 determines if additional calling party information exists within the SIP Invite message (since multiple sections containing the calling party information may exist within the SIP Invite message). The process at the blocks 540 and 550 may continue, in one embodiment, until all of the calling party information has been extracted from the SIP Invite message. Once the calling party information has been extracted from the SIP Invite message, the standard SIP processing of the SIP Invite message may continue at the block 530. Thus, in accordance with one or more embodiments of the present invention, the called party may have useful, and perhaps desirable, calling party information about the caller available to it at substantially the same time the call is answered. In another embodiment, the calling party information may be presented to the called party before the call is answered. As such, the called party may be in a position to advantageously use the calling party information available to it beforehand to consummate a sale, for example.

Figure 6:
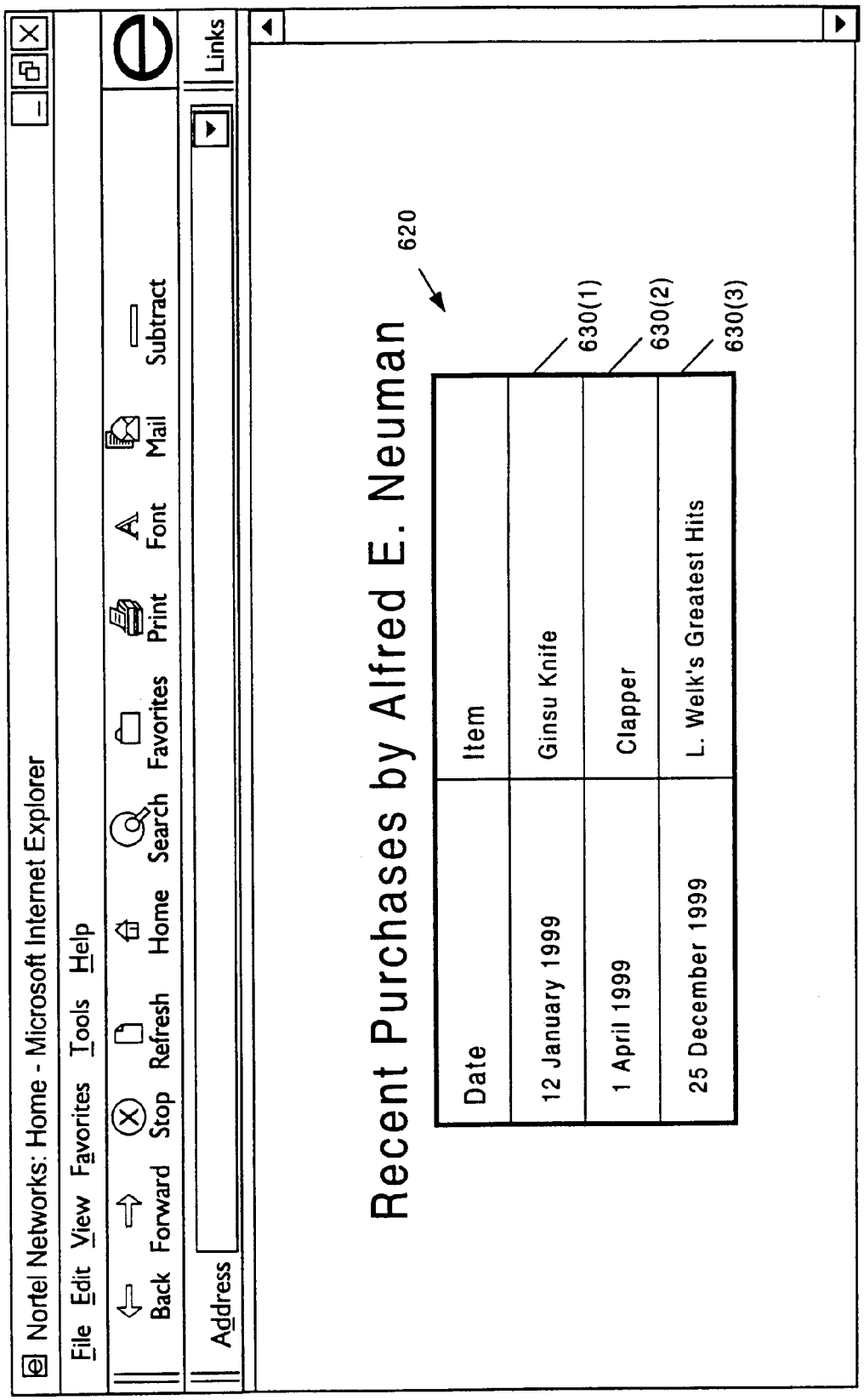
FIG. 6 illustrates an exemplary panel displaying the calling party information received in a call request in accordance with one embodiment of the present invention.

Referring now to FIG. 6, an exemplary calling party information included in the message 300 (see FIG. 3) is illustrated. FIG. 6 illustrates a web browser panel 610 that includes a table 620 depicting the calling party information, which in the illustrated embodiment include past purchases by Alfred E. Neuman. In the illustrated embodiment, the table 620 includes three entries 630(1-3). For example, the table 620 shows that on Jan. 12, 1999, Alfred E. Neuman purchased a Ginsu Knife, on Apr. 1, 1999 a clapper, and on Dec. 25, 1999 a L. Welk's Greatest Hits album. This calling party information may prove to be useful to the customer representative that answers the call from Alfred E. Neuman. The table 620 illustrates exemplary entries, as well as the type of information, that may be included in the SIP message. It should be understood that the particular type of information that may be included in the SIP Invite message may vary from one implementation to another. For example, pharmacies may wish to have access to past prescriptions of the calling party, dentists may wish to have access to dental records, doctors may wish to have access to past medical records of the calling patient, and so forth.

The various software layers, routines, or modules described herein may be executable on various processing elements as shown in FIG. 2, such a control unit 270. The control unit 270 is coupled to a storage device 275. The control unit 270 may include a microprocessor, a microcontroller, a processor card (including one or more microprocessors or microcontrollers), or other control or computing devices. As used here, a "controller" can refer to either hardware or software or a combination of the two.

The storage device 270 may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines or modules in the various network elements may be stored in respective storage devices. The instructions when executed by a respective control unit (or DSP) cause the corresponding network element to perform programmed acts.

The instructions of the software layers, routines, or modules may be transported to the network element in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. An apparatus for use in a data network, comprising:
   an interface to receive an invitation from a network device of a calling party over the data network to establish a call session, the invitation comprising a header portion and a body portion of the invitation; and
   a controller communicatively coupled to the interface, the controller to provide information regarding past purchases of the calling party in the body portion of the invitation.

2. The apparatus of claim 1, wherein the controller is adapted to look up the information regarding the past purchases of the calling party from a storage unit based on data stored in the header portion of the invitation.

3. The apparatus of claim 2, wherein the controller is adapted to look up the information regarding the past purchases of the calling party from a database stored in the storage unit.

4. The apparatus of claim 1, wherein the controller is adapted to append the information regarding the past purchases of the calling party in the body portion of the invitation using at least one of a Session Initiation Protocol control gateway interface and Session Initiation Protocol servlet.

5. The apparatus of claim 1, wherein the controller is adapted to append the information regarding the past purchases of the calling party in the body portion of the invitation.

6. The apparatus of claim 5, wherein the controller is adapted to update a content-length field in the header portion of the invitation based on at least the appended information regarding the past purchases of the calling party.

7. The apparatus of claim 5, wherein the controller is adapted to update a content-type field in the header portion of the invitation based on at least the appended information regarding the past purchases of the calling party.

8. The apparatus of claim 7, wherein the controller is adapted to update the content-type field to indicate multipart/mixed type.

9. The apparatus of claim 8, wherein the controller is adapted to display the information regarding the past purchases of the calling party.

10. The apparatus of claim 1, wherein the invitation comprises a Session Initiation Protocol message, and wherein the information regarding the past purchases of the calling party is provided in the Session Initiation Protocol message.

11. The apparatus of claim 10, wherein the invitation comprises an Invite request, and wherein the information regarding the past purchases of the calling party is provided in the Invite request.

12. The apparatus of claim 1, wherein the controller is adapted to forward the invitation comprising the information regarding the past purchases of the calling party to a presentation device.

13. The apparatus of claim 1, wherein the controller is adapted to provide the information regarding the past purchases of the calling party as information of Multipurpose Internet Mail Extensions type.

14. The apparatus of claim 13, wherein the information of the Multipurpose Internet Mail Extensions type is selected from a group consisting of Java Enhanced Session Initiation Protocol, Hyper Text Markup Language, and Extensible Markup Language.

15. The apparatus of claim 1, wherein the information regarding the past purchases of the calling party is information regarding a history of past purchases of the calling party.

* * * * *